(12) United States Patent
Mergen et al.

(10) Patent No.: US 8,595,738 B2
(45) Date of Patent: *Nov. 26, 2013

(54) ENERGY-AWARE COMPUTING ENVIRONMENT SCHEDULER

(71) Applicant: Raytheon BBN Technologies Corp., Cambridge, MA (US)

(72) Inventors: John-Francis Mergen, Baltimore, MD (US); Joshua N. Edmison, Ellicott City, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,473

(22) Filed: Apr. 1, 2013

(65) Prior Publication Data

US 2013/0219400 A1  Aug. 22, 2013

Related U.S. Application Data

(63) Continuation of application No. 13/616,576, filed on Sep. 14, 2012, now Pat. No. 8,413,154, which is a continuation of application No. 12/463,589, filed on May 11, 2009, now Pat. No. 8,291,422.

(51) Int. Cl.
*G06F 9/455* (2006.01)
*G06F 9/46* (2006.01)

(52) U.S. Cl.
USPC ........................................... 718/103

(58) Field of Classification Search
None
See application file for complete search history.

(56) References Cited

U.S. PATENT DOCUMENTS

| | | |
|---|---|---|
| 8,291,422 B2 | 10/2012 | Mergen et al. |
| 2008/0089709 A1 | 4/2008 | Higashi |
| 2008/0186918 A1 | 8/2008 | Tinnakornsrisuphap et al. |
| 2009/0307696 A1 | 12/2009 | Vals et al. |
| 2010/0185882 A1 | 7/2010 | Arnold et al. |
| 2011/0047552 A1 | 2/2011 | Mergen et al. |
| 2013/0014117 A1 | 1/2013 | Mergen et al. |

OTHER PUBLICATIONS

Eker et al.; A feedback scheduler for read-time controller tasks; May 2000.*
Kay et al. A Fair Share Scheduler; Jan. 1988.*
Less Watts, "Saving Power with Linux on Intel® Platforms," http://www.lesswatts.org/projects/index.php, Sep. 20, 2007, 3 pages.
J. Rabaey, "Scaling the Power Wall—A Systems Perspective," Si2/Open Access Conference, Apr. 16, 2008, 36 pages.

(Continued)

*Primary Examiner* — Corey S Faherty
(74) *Attorney, Agent, or Firm* — Harrity & Harrity, LLP

(57) ABSTRACT

A method includes receiving a process request, identifying a current state of a device in which the process request is to be executed, calculating a power consumption associated with an execution of the process request, and assigning an urgency for the process request, where the urgency corresponds to a time-variant parameter to indicate a measure of necessity for the execution of the process request. The method further includes determining whether the execution of the process request can be delayed to a future time or not based on the current state, the power consumption, and the urgency, and causing the execution of the process request, or causing a delay of the execution of the process request to the future time, based on a result of the determining.

20 Claims, 12 Drawing Sheets

(56) References Cited

OTHER PUBLICATIONS

E. Pinheiro et al., "Load Balancing and Unbalancing for Power and Performance in Cluster-Based Systems," Proceedings for the Workshop on Compilers and Operating Systems for Low Power, Sep. 2001, pp. 4-1 through 4-8.

J. Trajkovic et al., "Custom Processor Core Construction from C Code," Proceedings of Sixth IEEE Symposium on Application Specific Processors, Jun. 2008, pp. 1-6.

Dell Corp., "Dell Latitude Laptops," http://www.dell.com/latitude, May 27, 2005, 1 page.

Gumstix Inc., "Gumstix—dream, design, deliver," http://www.gumstix.com, 2004-2008, 1 page.

A. Cockroft, "Millicomputing—The Future in Your Pocket and Your Datacenter," Usenix Boston, Jun. 27, 2008, 43 pages.

Intel Corportation, "Intel® Atom™ Processor," http://www.intel.com/technology/atom/index.htm, Mar. 13, 2009 (print date) 1 page.

Arm Ltd., "Processor Overview," http://www.arm.com/products/CPUs, Mar. 13, 2009 (print date) 1 page.

* cited by examiner

| ENVIRONMENTAL TABLE 405 | TEMPERATURE 505 | THERMAL MASS 510 | RELATIVE DENSITY 515 | AIR PRESSURE 520 | HUMIDITY 525 | DENSITY ALTITUDE 530 |
|---|---|---|---|---|---|---|
| CURRENT 535 | | | | | | |
| PROJECTED 540 | | | | | | |

FIG. 5

| PROCESS REQUESTS 605 | URGENCY 610 | RESOURCE NEED 615 |
|---|---|---|
| | | |
| | | |
| ••• | ••• | ••• |
| | | |
| | | |

REQUEST TABLE 410

FIG. 6

| CURRENT STATE TABLE 415 | CURRENT STATE 705 | PROJECTED STATE 715 |
|---|---|---|
| DEVICE COMPONENT 710-1 | | |
| DEVICE COMPONENT 710-2 | | |
| ... | ... | ... |
| DEVICE COMPONENT 710(N-1) | | |
| DEVICE COMPONENT 710-N | | |

FIG. 7

ENERGY-AWARE COMPUTING ENVIRONMENT SCHEDULER

RELATED APPLICATIONS

This application is a continuation of U.S. patent application Ser. No. 13/616,576, filed Sep. 14, 2012, which is a continuation of U.S. patent application Ser. No. 12/463,589, filed May 11, 2009 (now U.S. Pat. No. 8,291,422). The disclosures of which are incorporated herein by reference.

BACKGROUND

Energy consumption and energy availability have become major concerns in the operation of computing systems. For example, in large-scale environments, the cost of power and the availability to provide enough power can be a limiting factor towards the growth of large data centers. Similarly, in portable environments, the ability to extend battery life has become a critical issue for users and manufacturers.

SUMMARY

According to one implementation, a method may include receiving, by a reduced energy scheduler (RES), a process request, identifying, by the RES, a current state of a device in which the process request is to be executed, calculating, by the RES, a power consumption associated with an execution of the process request, assigning, by the RES, an urgency for the process request, where the urgency corresponds to a time-variant parameter to indicate a measure of necessity for the execution of the process request, determining, by the RES, whether the execution of the process request can be delayed to a future time or not based on the current state, the power consumption, and the urgency, and causing, by the RES, the execution of the process request, or causing, by the RES, a delay of the execution of the process request to the future time, based on a result of the determining.

According to another implementation, a device may include a memory to store instructions, and a processor to execute the instructions in the memory to receive a process request, identify a current state of the device or a current state of another device in which the process request is to be executed, calculate a power consumption associated with an execution of the process request, receive environmental information, assign an urgency level to the process request, where the urgency level corresponds to a time-variant parameter to indicate a measure of importance for the execution of the process request, determine whether the execution of the process request can be delayed to a future time or not based on the current state, the power consumption, environmental information, and the urgency level, and cause the execution of the process request or delay the execution of the process request based on a result of the determine.

According to still another implementation, a computer-readable medium may containing instructions executable by at least one processor. The computer-readable medium may include one or more instructions for receiving a process request that will cause a process to be executed, one or more instructions for identifying one or more resources that are needed for the execution of the process request, one or more instructions for calculating a power consumption associated with the execution of the process request, one or more instructions for associating an urgency with the process request, where the urgency corresponds to a time-variant parameter to indicate a measure of necessity for the execution of the process request, one or more instructions for determining whether the execution of the process request can be delayed to a future time or not based on the one or more resources, the power consumption, and the urgency, and one or more instructions for causing the execution of the process request or delay the execution of the process request to the future time based on a result of the determine.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5 is a diagram illustrating an exemplary environmental table;

FIG. 6 is a diagram illustrating an exemplary request table;

FIG. 7 is a diagram illustrating an exemplary current state table;

DETAILED DESCRIPTION

The following detailed description refers to the accompanying drawings. The same reference numbers in different drawings may identify the same or similar elements. Also, the following description does not limit the invention. Instead, the scope of the invention is defined by the appended claims and equivalents.

The term "urgency," as used herein, is intended to correspond to a time-based parameter or a time-variant parameter to indicate a measure of importance or a measure of necessity to execute a process or a process request. As described herein, an urgency parameter may vary through time, and not necessarily, in a linear way. This is in contrast to a priority parameter, which is typically a static measure of importance and/or is time-invariant. As will be described, a process request or a process may be assigned a level of urgency.

Embodiments described herein provide methods, devices, and systems that may schedule the execution of processes and process requests, in an energy-aware way, based on levels of urgency associated with the processes or process requests, current device state information, power consumption information associated with the execution of the processes and the process requests, and environmental factors. The scheduler may consider these factors individually and/or in an interrelated manner. The scheduler may operate in conjunction with an existing operating system (OS) state controller (e.g., a process scheduler and a hardware controller) of a host device. Since the embodiments have been broadly described, variations exist. Accordingly, a detailed description of the embodiments is provided below.

Exemplary Environment

Figure 1:
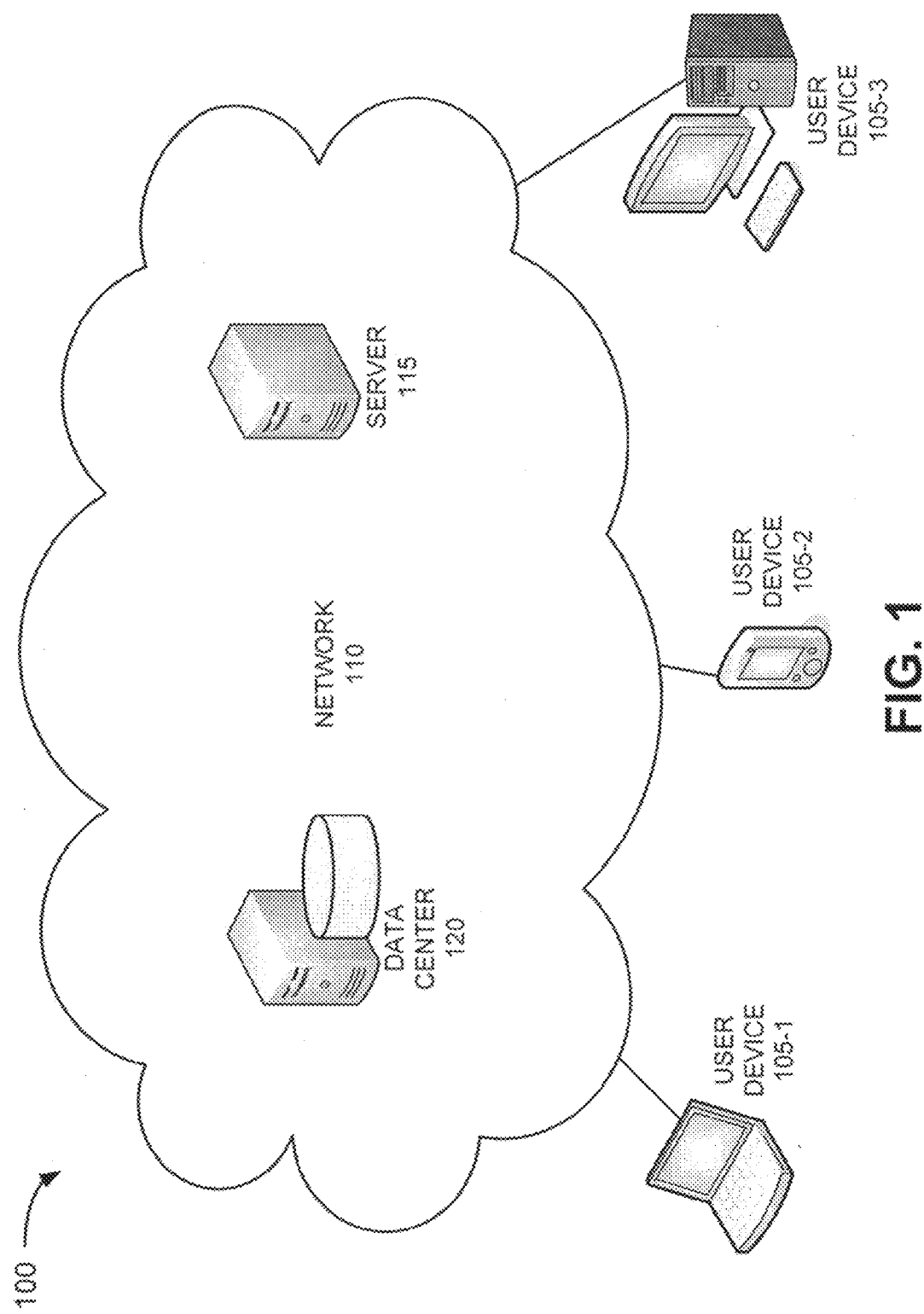
FIG. 1 is a diagram illustrating an exemplary environment in which methods, devices, and systems described herein may be implemented.

FIG. 1 is a diagram illustrating an exemplary environment 100 in which methods, devices, and systems described herein may be implemented. As illustrated in FIG. 1, environment 100 may include user devices 105-1, 105-2, and 105-3 (referred to generically as user device 105) communicatively coupled to a network 110. Network 110 may include a server 115 and a data center 120. The number of devices and configuration in environment 100 is exemplary and provided for simplicity. In practice, environment 100 may include more, fewer, different, and/or differently arranged devices than those illustrated in FIG. 1. Also, some functions or processes described as being performed by a device of FIG. 1 may be performed by a different device or a combination of devices. Environment 100 may include wired and/or wireless connections among the devices.

User device 105 may include a device having communicational and/or computational capabilities. For example, user device 105 may correspond to a computer (e.g., a laptop, a desktop computer, a handheld computer), a personal digital assistant, a wireless telephone, or another type of communication device and/or computational device.

Network 110 may include one or multiple networks of any type. For example, network 110 may include a wired network, a wireless network, a private network, a public network, a local area network (LAN), a metropolitan area network (MAN), a wide area network (WAN), the Internet, an intranet, a telephone network (e.g., the Public Switched Telephone Network (PSTN) or a cellular network), a satellite network, and/or a computer network.

Server 115 may include a device having communicational capabilities. For example, server 115 may correspond to a computer. Data center 120 may include a device having communicational capabilities. For example, data center 120 may include one or multiple computers and data storage devices. Data center 120 may provide a service, data, and/or some other type of asset.

User device 105, server 115 and data center 120 may perform various processes related to their operation. These processes may be executed based on various process requests.

Exemplary Device Architecture

Figure 2:
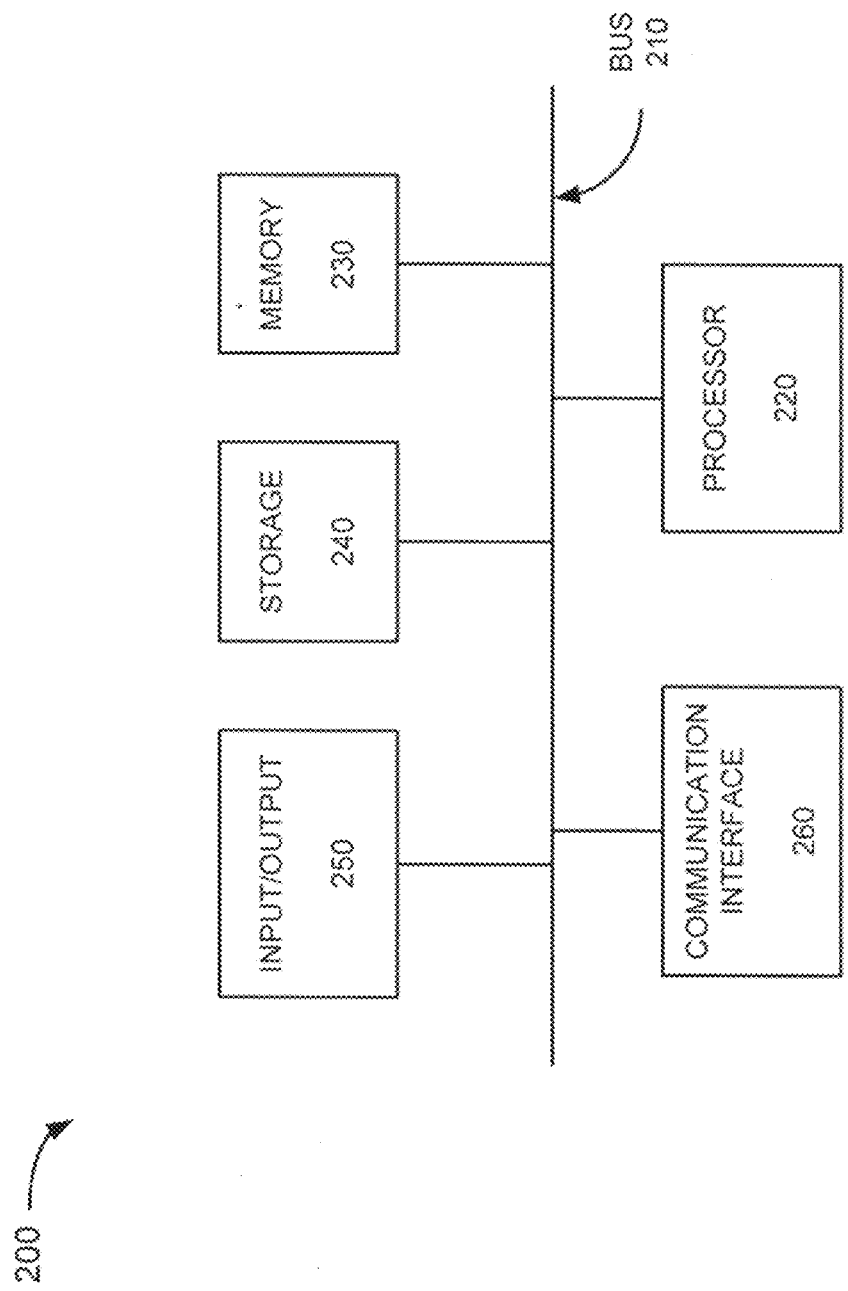
FIG. 2 is a diagram illustrating exemplary components of a device corresponding to one or more of the devices depicted in FIG. 1.

FIG. 2 is a diagram illustrating exemplary components for a device 200 that may correspond to one or more of the devices depicted in FIG. 1, such as, user device 105, server 115, and data center 120. As illustrated, device 200 may include, for example, a bus 210, a processor 220, a memory 230, storage 240, an input/output 250, and a communication interface 260.

Bus 210 may permit communication among the other components of network device 115. For example, bus 210 may include a system bus, an address bus, a data bus, and/or a control bus. Bus 210 may also include bus drivers, bus arbiters, bus interfaces, and/or clocks.

Processor 220 may interpret and/or execute instructions and/or data. For example, processor 220 may include a processor, a microprocessor, a data processor, a co-processor, a network processor, an application specific integrated circuit (ASIC), a controller, a programmable logic device, a field programmable gate array (FPGA), or some other processing logic that may interpret and/or execute instructions.

Memory 230 may store data and/or instructions. For example, memory 230 may include a random access memory (RAM), a dynamic random access memory (DRAM), a static random access memory (SRAM), a synchronous dynamic random access memory (SDRAM), a read only memory (ROM), a programmable read only memory (PROM), an erasable programmable read only memory (EPROM), an electrically erasable programmable read only memory (EEPROM), another type of dynamic or static memory, a cache, and/or a flash memory.

Storage 240 may store data, instructions, and/or applications. For example, storage 240 may include a hard disk (e.g., a magnetic disk, an optical disk, a magneto-optic disk, or the like), a compact disc (CD), a digital versatile disc (DVD), a floppy disk, a cartridge, a magnetic tape, a flash drive, or another type of computer-readable medium, along with a corresponding drive. The term "computer-readable medium" is intended to be broadly interpreted to include, for example, memory, storage or the like. A computer-readable medium may be implemented in a single device, in multiple devices, in a centralized manner, or in a distributed manner.

Input/output 250 may permit input to and output from device 200. For example, input/output 250 may include a keyboard, a keypad, a mouse, a button, a switch, a microphone, voice recognition logic, a pen, a display, a port, or the like to permit input. Additionally, or alternatively, input/output 250 may include a display, a speaker, one or more light emitting diodes (LEDs), a port, or the like, to permit output.

Communication interface 260 may enable device 200 to communication with another device, a network, another system, and/or the like. For example, communication interface 260 may include a wireless interface and/or a wired interface, such as, an Ethernet interface, an optical interface, etc. Communication interface 260 may include a transceiver.

Device 200 may perform operations and/or processes related to scheduling of processes. According to an exemplary implementation, device 200 may perform these operations and/or processes in response to processor 220 executing sequences of instructions contained in a computer-readable medium. For example, software instructions may be read into memory 230 from another computer-readable medium, such as storage 240, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 2 illustrates exemplary components of device 200, in other implementations, device 200 may include additional, fewer, different, or differently arranged components than those illustrated in FIG. 2 and described herein. Additionally, or alternatively, one or more operations described as being performed by a particular component may be performed by one or more other components, in addition to or instead of the particular component.

Figure 3:
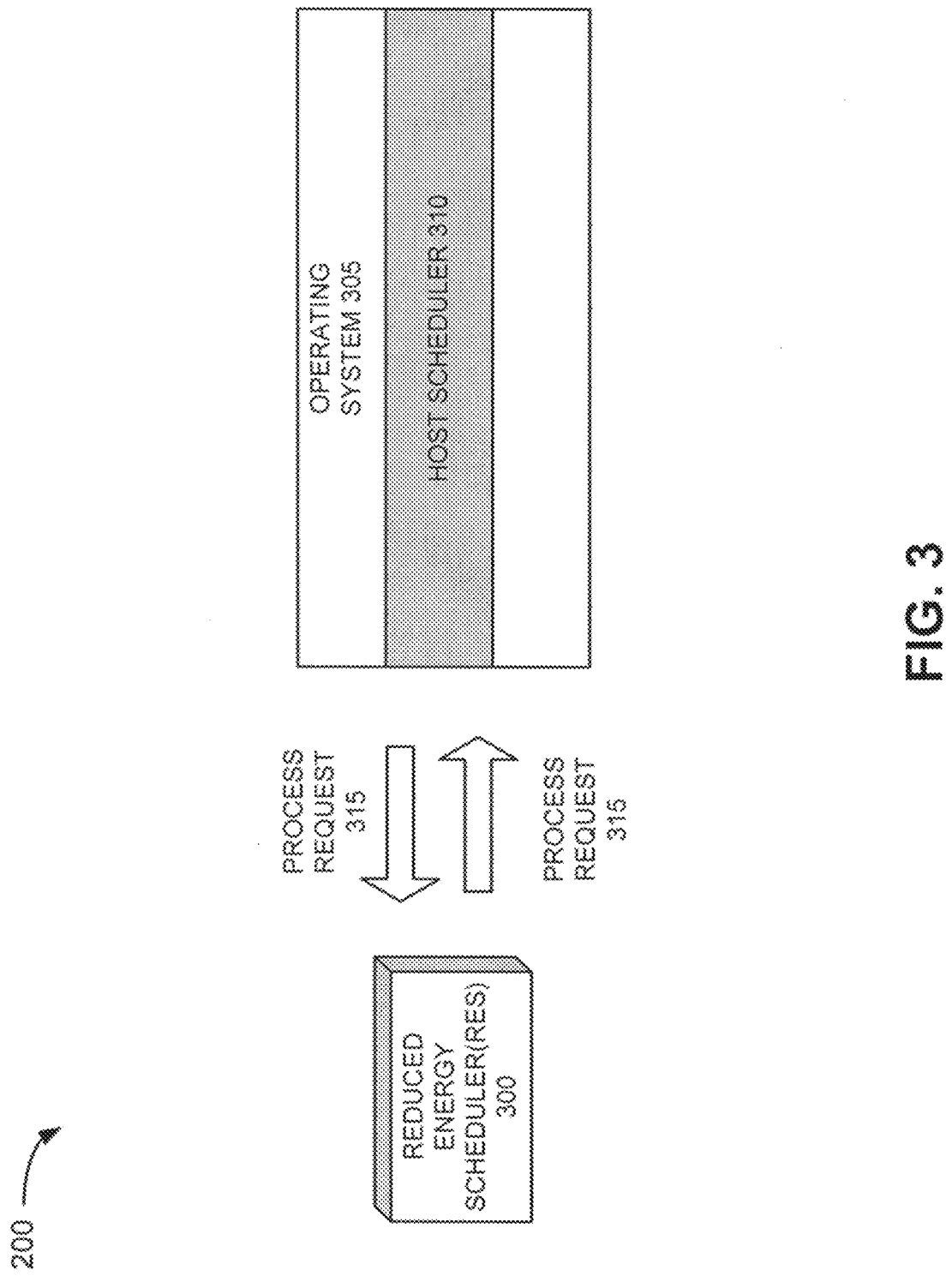
FIG. 3 is a diagram illustrating exemplary functional components of the devices depicted in FIG. 1 and the device depicted in FIG. 2.

FIG. 3 is a diagram illustrating exemplary functional components of device 200. As illustrated, device 200 may include a reduced energy scheduler (RES) 300, an operating system (OS) 305, and a host scheduler 310. RES 300 may be implemented by hardware (e.g., processor 220) or a combination of hardware (e.g., processor 220) and software.

RES 300 may manage the execution of processes and/or process requests. As described herein, RES 300 may determine a time when a process and/or a process request is to be executed based on urgency, state information, power consumption, and environmental factors. RES 300 may consider these factors within a time window, such as, for example, a current time period and/or a future time period. The term "process request," is intended to be broadly interpreted to include, for example, a message which is presented to an OS (e.g., OS 305) and requesting that an operation be performed (e.g., start a specific program). By way of example, a process request may include a program name and location, and additional information to run the process (e.g., input and output paths, communications, memory and storage information, and/or a number and type of processors needed, etc.

RES 300 may also manage an on-going process and make a determination to remove the process if it has a low urgency and/or power consumption can be reduced. Additionally, or alternatively, RES 300 may remove a process request when the execution of the process request is no longer needed. For example, a process request may correspond to a reminder for a user to attend a meeting. Thereafter, the user deletes the reminder because the meeting has been cancelled. In such an instance, RES 300 may be informed to discard the process request. RES 300 will be described in greater detail below.

OS 305 may provide an interface between hardware and applications. OS 305 may correspond to a Windows OS, a MAC OS, a Linux OS, or the like. Host scheduler 310 may correspond to a scheduler included in the host device (e.g., in the host device's OS). Host scheduler 310 may manage processor utilization, throughput (e.g., the number of processes that complete their execution per unit of time), turnaround (e.g., the amount of time to execute a particular process), response time (e.g., the amount of time it takes from when a process request is submitted until a response is produced), as well as other parameters associated with the management of processes and/or process requests.

As illustrated in FIG. 3, in an exemplary operation, RES 300 may obtain a process request 315 that is to be executed. In an exemplary implementation, RES 300 may obtain process request 315 based on an inter-process communication link. For example, RES 300 may retrieve process request 315 from a shared resource (e.g., a memory) that stores process requests. Additionally, or alternatively, RES 300 may obtain process request 315 based on a communication (e.g., via a communication channel) with host scheduler 310. For example, host scheduler 310 may push process request 315, via the communication channel, to RES 300.

As will be described herein, RES 300 may determine an appropriate time for process request 315 to be executed based on power consumption and urgency. RES 300 may utilize a bin-packing approach versus a knapsack approach or a decaying queue approach for scheduling the execution of processes and process requests. For example, RES 300 may utilize a sliding time window, bin packing approach, to attain the best power consumption permitted within the time window. RES 300 may utilize various parameters, such as, for example, urgency associated with process request 315, current device state information, power consumption associated with the execution of process request 315, and environmental factors, to determine the appropriate time to execute process request 315. When RES 300 determines the appropriate time, RES 300 may send process request 315 to host scheduler 310. Host scheduler 310 may then provide for the execution of process request 315.

Although FIG. 3 illustrates exemplary functional components of device 200, in other implementations, RES 300 may be implemented in a different manner. For example, RES 300 may operate on a different device than OS 305 and host scheduler 310. For example, in a data center environment, RES 300 may reside on a device that is communicatively coupled to a group of other devices. In this way, RES 300 may manage processes and/or processing requests associated with one or more other host devices.

Figure 4:
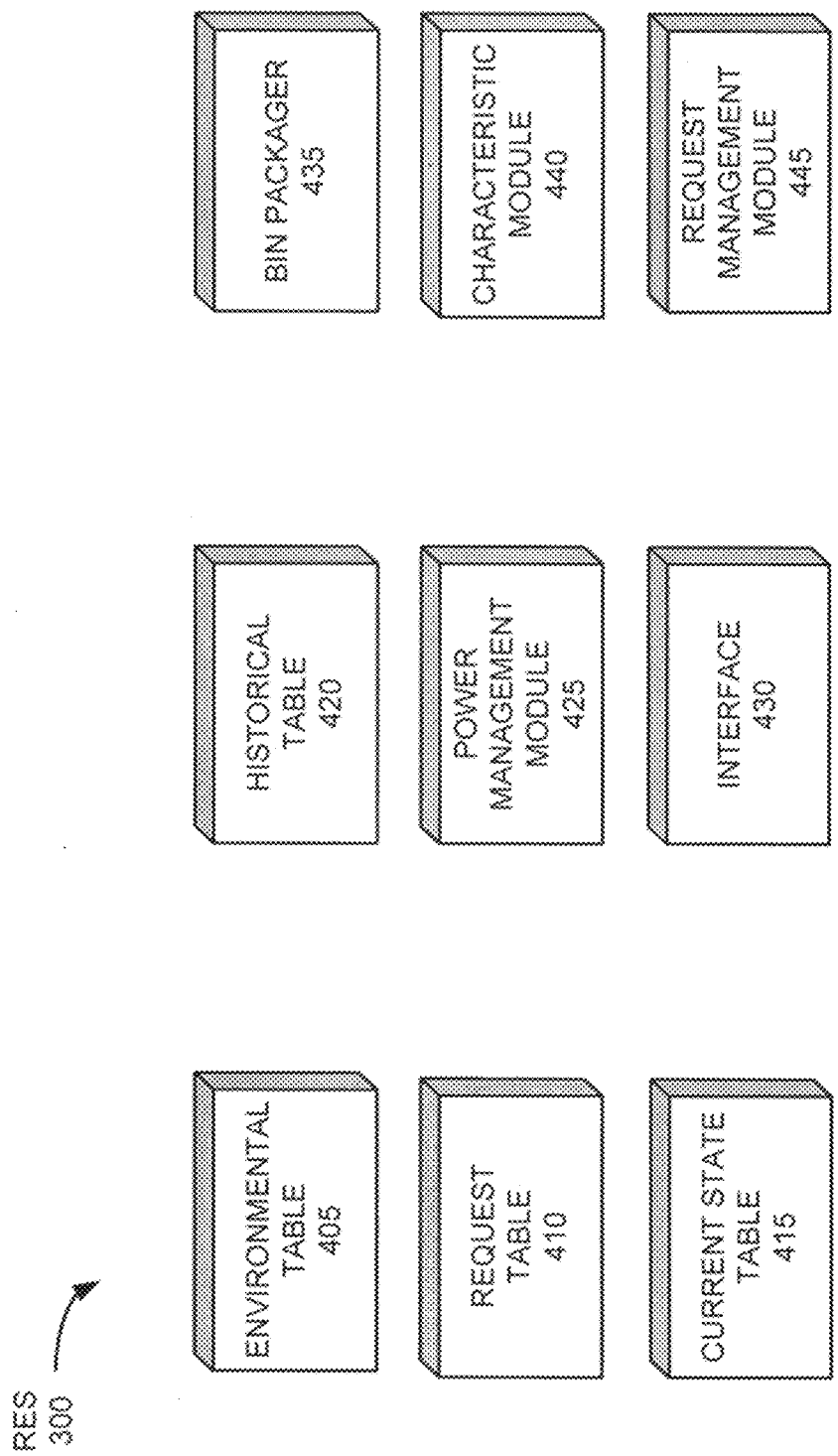
FIG. 4 is a diagram illustrating exemplary functional components of a reduced energy scheduler (RES)

FIG. 4 is a diagram illustrating exemplary functional components of RES 300. As illustrated in FIG. 4, RES 300 may include an environmental table 405, a request table 410, a current state table 415, a historical table 420, a power management module 425, an interface 430, a bin packager 435, a characteristic module 440, and a request management module 445. The functional components illustrated in FIG. 3 may be implemented by hardware (e.g., processor 220, memory 230, storage 240, etc.) or a combination of hardware and software. While a particular number and arrangement of components are illustrated in FIG. 3, in other implementations, RES 300 may include fewer, additional, different, or differently arranged components than those illustrated in FIG. 4.

Environmental table 405 may include an arrangement of data corresponding to external environmental variables. For example, environmental table 405 may include environmental variables, such as, temperature, thermal mass (i.e., the amount of heat the environment can absorb for each degree of temperature rise), air pressure, humidity, and density altitude (e.g., a measure of air pressure and enthalpy of the air). RES 300 may utilize environmental table 405 to calculate various loads that may be placed on the thermal management capabilities of the host device (e.g., device 200). For example, RES 300 may accurately anticipate the need for fans or other forms of cooling and/or accurately anticipate an addition to the processing load or other types of resources, etc. RES 300 may receive the environmental variable information from, for example, sensors of the host device.

Request table 410 may include an arrangement of data corresponding to requests for the processing capabilities of the host device (e.g., device 200). Requests by/from RES 300 may include, in addition to information typically included in a process request, an urgency parameter and a resource need parameter.

The urgency parameter may indicate a measure of urgency. The urgency parameter may include a current urgency. The urgency parameter may also include a projected urgency. For example, the projected urgency may be calculated based on an urgency rate and current urgency. For example, the urgency rate may indicate a rate in which urgency increases through time. By way of example, the urgency parameter may indicate a low level of urgency at a time T(0) for running a virus scan. However, at a time T(N), the urgency parameter may indicate an extremely high level of urgency for running the virus scan. RES 300 may anticipate, at time T(0), the extremely high level of urgency at time T(N), based on the urgency parameter (i.e., the projected urgency). In one implementation, an initial or default urgency and the urgency rate associated with the urgency parameter may be specified by a system administrator or a developer.

The resource need parameter may indicate the type of resources needed to execute the process. For example, the resource need parameter may include information, such as, the frequency of disk access, anticipated processing load, anticipated memory usage, display usage (e.g., blanked or not), other types of load, resource usage information, and the like. The resource need parameter may also include duty cycle information (e.g., a time period that a resource would be utilized to execute the process). In one implementation, the resource need parameter may be specified by a system administrator or a developer.

Current state table 415 may include an arrangement of data corresponding to a current state of all of the power consuming components of the host device (e.g., device 200). For example, current state table 415 may include state information associated with a hard disk, a fan, a connection to another device, a display, a processor, etc. State information may include, for example, whether the component is on or off, a speed (e.g., 3.2 GHz, 400 R.P.M.) at which the component is operating, a mode (e.g., idle, standby, active, etc) at which the component is operating, as well as other characteristic information associated with the component. Based on the information in current state table 415, RES 300 may make power-up and power-down decisions. Additionally, in some implementations, current state table 415 may also include data corresponding to a projected state of all of the power consuming components of the host device. The projected state may correspond to the state of all the power consuming components at a future time. RES 300 may obtain the state information based on, for example, OS process tables, details from a memory map, allocated resources in an OS resource allocation table, and/or a communications management system appropriate to the OS.

Historical table 420 may include an arrangement of historical data relating to the execution or non-execution of process requests and/or processes during a previous time period, and state information associated with components of the host device during a previous time period. Based on the information in historical table 420, RES 300 may make power-up and power-down decisions. For example, RES 300 may have a process request to execute. Historical table 420 may indicate that the hard disk powers up every 30 minutes. Based on this information, RES 300 may delay the execution of the process request, instead of powering up the hard disk now, since it is probable that the hard disk will power up again in the near future (i.e., within another 30 minute period). Conversely, the historical table 420 may indicate that the hard disk has not powered up within the past 4 hours. Based on this information, RES 300 may not delay the execution of the process request, since it is probable that the hard disk will not power up again in the near future.

Power management module 425 may include rules for managing the state of components on the host device (e.g., device 200). For example, power management module 425 may include rules relating to hibernation, sleep, idle, standby, spin-up, spin-down, brightness, speed, transmit power, and other settings relating to the state and/or characteristic of a component of the host device (e.g., device 200). In some instances, the host device may provide a user interface for these rules. For example, a systems preferences/energy saver or settings/power menu may be provided.

Interface 430 may include an interface to host scheduler 310 of the host device (e.g., device 200). RES 300 may present a request to the host device's scheduler to, for example, start, stop, or suspend a process, via interface 430. In other words, RES 300 may serve as an intermediary between process requests and an existing scheduler residing on the host device.

Bin packager 435 may utilize a bin-packing algorithm for scheduling the execution of processes and process requests. Bin packager 435 may utilize a sliding time window to attain the best power consumption permitted within the time window. Bin packager 435 may determine, based on the aggregation of the other components, which (and when) processes and process requests are executed and which (and when) processes and processes requests are delayed for execution. Bin packager 435 may also determine which (and how) processes and process requests are executed. For example, bin packager 435 may determine whether a process may be executed in a degraded mode (e.g., to minimize power consumption and/or the utilization of resources) or not. Bin packager 435 may manage and/or utilize data in various tables (e.g., environmental table 405, request table 410, current table 415, historical table 420) to make various determinations related to the scheduling and/or execution of processes and process requests. For example, bin packager 435 may schedule a process request or process based on its urgency and the ability of the host device to service the process request without requiring additional power consuming components. In some instances, bin packager 435 may remove the process request from the current power consuming bin when the process request has, for example, a low urgency, a low priority, and power consumption can be reduced. In such instances, the process request may be placed in a future power consuming bin. Bin packager 435 may re-evaluate whether the process request should be executed at a future time. In some instances, the urgency level of the process request may change (e.g., from low urgency to a higher level of urgency) as it ages through time. Nevertheless, bin packager 435 may delay the execution of the process request or execute the process request in an energy-aware way without sacrificing system needs.

Characteristic module 440 may include functions that relate to power, thermal, and transient characteristics of the host device (e.g., device 200). By way of example, these functions may correspond to power consumption curves, thermal curves, and transient curves. For example, a power consumption curve may correspond to an operational state of a hard disk (e.g., running, shut-off) vis-à-vis power consumption, or other type of characteristics, such as load capacity (e.g., number of instructions) vis-à-vis power consumption. A transient curve may correspond to the operational state (e.g., transitioning from shut-down to spin) or other characteristics vis-à-vis power consumption. A thermal curve may correspond to thermal characteristics associated with various components of the host device vis-à-vis power consumption. Based on the characteristic module 440, RES 300 may manage power consumption associated with various components of the host device. For example, characteristic module 440 may include a function that relates cooling capability (e.g., based on environmental factors, such as external air temperature) to fan speed and fan current-draw at a given speed. RES 300 may anticipate the need for additional power and moderate the starting and running of a process based on these functions.

Request management module 445 may manage process requests. For example, a process request may originate from the OS of the host device (e.g., device 200), a user's actions, a network service, or other sources to run a process on the host device. Request management module 445 may receive the process request, via interface 430, and store the process request in request table 410. Additionally, request management module 445 may send the process request, via interface 430, to host scheduler 310, to be executed.

The process request managed by request management module 445 may include, in addition to normal or conventional request information, other types of information, such as, for example, urgency information, current and anticipated device state information, power consumption information associated with the execution of processes and process requests, and environmental factors.

FIG. 5 is a diagram illustrating an exemplary environmental table 405. As illustrated, environmental table 405 may include a temperature field 505, a thermal mass field 510, a relative density field 515, an air pressure field 520, a humidity field 525, and a density altitude field 530. Temperature field 505, thermal mass field 510, relative density field 515, air pressure field 520, humidity field 525, and density altitude field 530, may correspondingly include information related to temperature, thermal mass, relative density, air pressure, humidity, and density altitude. Additionally, environmental table 405 may include a current field 535 and a projected field 540. Current field 535 and projected field 540 may relate to a current time and a future time, respectively. For example, environmental table 405 may provide, for each of temperature, thermal mass, relative density, air pressure, humidity, and density altitude, a current value and an projected or predicted value (e.g., for a future time) for each environmental variable. In some instances, the temperature may be the same with respect to a current value and a projected value. In other instances, the temperature may be different with respect to the current value and the projected value. By way of example, device 200 may subject to direct sunlight later in the day, but not earlier in the day. In this instance, the difference in temperature between current and projected values may be periodic (i.e., a daily occurrence). In other instances, this may not be the case. For example, the difference in temperature between current and projected values may relate to resources running while a process is executing, either currently, or at a future time, a controlled environment, etc.

Although FIG. 5 illustrates an exemplary environmental table 405, in other implementations, environmental table 405 may include additional, fewer, or different types of information with respect to environmental factors and/or time.

FIG. 6 is a diagram illustrating an exemplary request table 410. As illustrated, request table may include a process requests field 605, an urgency field 610 and a resource need field 615.

Process request field 605 may include process request information. Depending on device 200 and the type of process request, the process request information may vary. For example, a process request may correspond to starting an application, converting data, calculating a value, etc.

Urgency field 610 may include urgency parameter information, as previously described with respect to FIG. 4. Resource need field 615 may include resource need parameter information, as previously described with respect to FIG. 4.

Although FIG. 6 illustrates an exemplary request table 410, in other implementations, request table 410 may include additional, fewer, or different information with respect to process requests and/or processes.

FIG. 7 is a diagram illustrating an exemplary current state table 415. As illustrated, current state table 415 may include a current state field 705 with respect to device component fields 710-1 through 710-N (referred to generically as "device component field 710"). In some implementations, current state table 415 may include a projected state field 715.

Current state field 705 may include information related to the current state of a component of device 200. Device component field 710 may indicate a particular component of device 200. For example, if device component field 710-1 pertains to a hard disk, current state 705 may indicate that the hard disk is in a spin-up state.

Projected state field 715 may include information related to the projected state of a component of device 200. RES 300 may identify a projected state based on environmental table 405, request table 410, and/or historical table 420.

Although FIG. 7 illustrates an exemplary current state table 415, in other implementations, current state table 415 may include additional, fewer, or different information with respect to state information.

Figure 8:
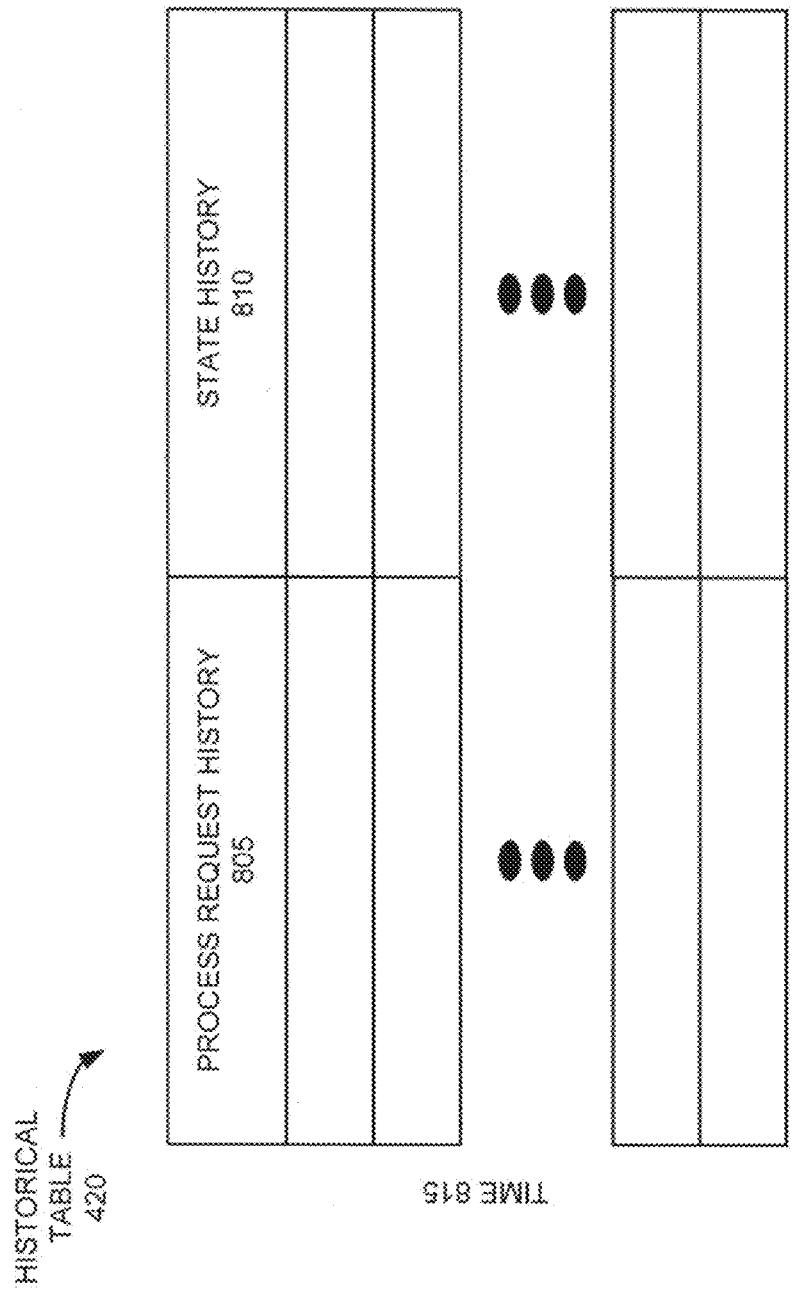
FIG. 8 is a diagram illustrating an exemplary historical table.

FIG. 8 is a diagram illustrating an exemplary historical table 420. As illustrated, historical table 420 may include a process request history field 805 and a state history field 810. Process request history field 805 may include information related to the execution or non-execution of processes or process requests within a period of time. In addition to which (and when) a process or process request was executed or not executed, process history information may include a duration associated with the execution of a process, the type of process, a frequency, and/or other types of process history information (e.g., whether the process was executed in a degraded mode). State history field 810 may include information related to the state of components of the host device within a period of time.

Process request history field 805 and state history field 810 may correspond to a time 815. Time 815 may represent a time history period (e.g., 1 day, two days, a month, etc.) in which the process request history information and state history information represents. Time 815 may be user-configurable.

Although FIG. 8 illustrates an exemplary historical table 420, in other implementations, historical table 420 may include additional, fewer, or different information with respect to historical data.

Exemplary Process

Figure 9:
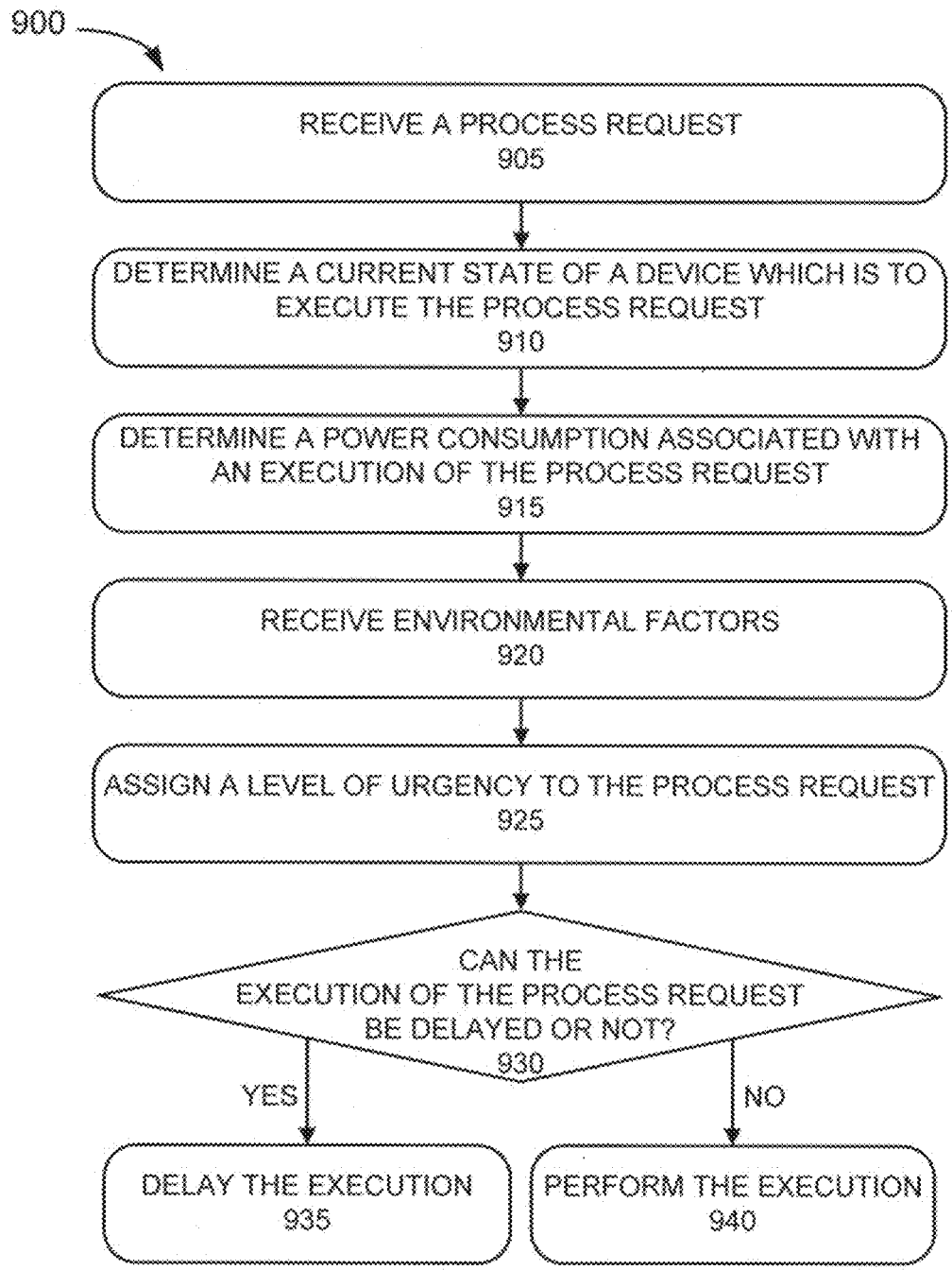
FIG. 9 is a flow diagram illustrating an exemplary process for scheduling processes or process requests based on urgency.

FIG. 9 is a flow diagram illustrating an exemplary process 900 for scheduling processes or process requests based on power consumption and urgency. Process 900 may be performed by hardware, or a combination of hardware and software in device 200. In another implementation, one or more operations associated with process 900 may be performed by another device in conjunction with device 200. Process 900 will be described in conjunction with other figures.

It will appreciated that, although process 900 is described with an assumption that RES 300 and host scheduler 310 reside in the same device, in other implementations, this may not be the case. Stated differently, it is assumed that RES 300 resides on the host device that is to execute the process or process request. In other implementations, this may not be the case.

Process 900 may begin with receiving a process request (block 905). RES 300 may receive a process request associated with a host device (e.g., device 200). For example, as previously described with respect to FIG. 3, RES 300 may utilize an inter-process communication link. The inter-process communication link may correspond to a shared resource (e.g., a memory) that stores the process request. Additionally, or alternatively, RES 300 may obtain the process request based on a communication (e.g., via a communication channel) with host scheduler 310. For example, host scheduler 310 may push the process request on the communication channel to RES 300. RES 300 may receive the request, via interface 430, and store the process request in request table 410.

A current state of a device, which is to execute the process request, may be determined (block 910). RES 300 may determine a current state of the host device. For example, RES 300 may utilize current state table 415 to determine the current state of various components of the host device.

A power consumption associated with an execution of the process request may be determined (block 915). For example, request table 410 of RES 300 may identify the resources needed to execute the process request. Additionally, current state table 415 may include the current state of the host device. Based on the request table 410 and current state table 415, RES 300 may determine the power consumption needed to execute the process request. It will be appreciated that RES 300 may utilize other types of information to determine the power consumption needed to execute the process request. For example, RES 300 may utilize characteristic module 440.

Environmental factors may be received (block 920). RES 300 may receive environmental factor information from, for example, sensors of the host device. Environmental table 405 may store the received environmental factors. The environmental factors may include, for example, temperature, thermal mass (i.e., the amount of heat the environment can absorb for each degree of temperature rise), air pressure, humidity, and/or density altitude (e.g., a measure of air pressure and enthalpy of the air).

A level of urgency may be assigned to the process request (block 925). As previously described, request table 410 may include an urgency field 610 that indicates a measure of urgency of the process request. In one implementation, an initial or default urgency may be specified by a system administrator or a developer. It will be appreciated, as previously described, that the urgency may change through time according to the urgency rate.

It may be determined whether the execution of the process request may be delayed or not (block 930). For example, bin packager 435 of RES 300 may determine whether the execution of the process request may be delayed or not based on the current state of the host device, the power consumption associated with the execution of the process request, environmental factors, and the urgency.

If it is determined that the execution of the process request may be delayed (block 930-YES), then the execution of the process request may be delayed (block 935). For example, bin packager 435 may delay the execution of the process request until a future time. At such future time, bin packager 435 may determine whether the execution of the process request may be delayed or not.

On the other hand, if it is determined that the execution of the process request may not be delayed (block 930—NO), then the execution of the process request may be performed (block 940). For example, bin packager 435 may determine that the execution of the process request be performed. In some instances, bin packager 435 may further determine whether the process should be executed in a degraded mode. RES 300 may send the process request to host scheduler 310. Host scheduler 310 may then provide for the execution of the process request.

Although FIG. 9 illustrates an exemplary process 900, in other implementations, fewer, additional, or different operations may be performed. For example, RES 300 may determine whether the execution of the process request may be delayed to the future time or not based on information, in addition to, or instead of, current state, power consumption, and urgency. In one implementation, RES 300 may identify process requests scheduled to be executed at the future time and calculate the projected power consumption to execute those process requests. Based on this information, RES 300 may determine whether the execution of the process request may be delayed to the future time or not. Additionally, or alternatively, RES 300 may determine a projected state of the host device based on environmental table 405, request table 410, and/or historical table 420. Based on projected state, RES 300 may determine whether the execution of the process request may be delayed to the future time or not. Additionally, or alternatively, a threshold value of urgency may be utilized to determine when the process request must be executed. For example, RES 300 may compare the urgency associated with the process request to the threshold value of urgency. If the urgency exceeds the threshold value of urgency, RES 300 may determine that the execution of the process request cannot be delayed. Additionally, or alternatively, RES 300 may determine a projected urgency for the process request based on the urgency rate. Based on the projected urgency, RES 300 may determine whether the execution of the process request may be delayed to the future time or not. Additionally, or alternatively, RES 300 may determine the resources or components needed to execute the process request, as illustrated in resource need field 615, and described herein. Based on the resources needed, RES 300 may determine whether the execution of the process request may be delayed to the future time or not. Additionally, or alternatively, RES 300 may determine whether the execution of the process request may be delayed to the future time or not based on characteristic module 440. Additionally, or alternatively, it will be appreciated that RES 300 may determine whether the process request may be executed in a degraded mode instead of delaying the processing request to the future time. For example, RES 300 may permit the execution of a process request with a limited set of resources associated with the execution of the process.

EXAMPLES

Figure 10:
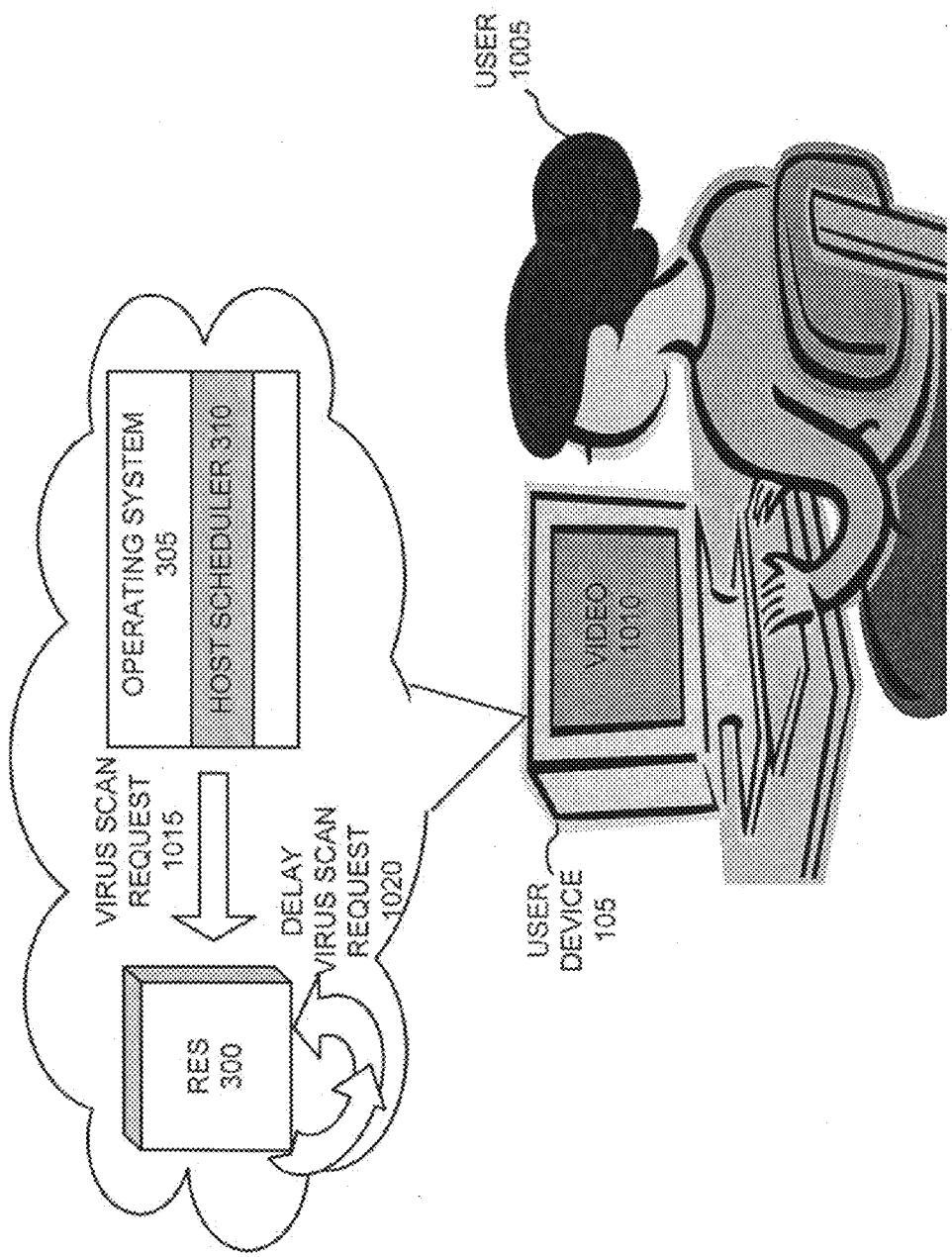
FIG. 10 is a diagram illustrating an example of the RES managing an exemplary process request.

FIG. 10 is a diagram illustrating an example of the RES managing an exemplary process request. As illustrated, a user 1005 may be watching a video 1010 on user device 105. For purposes of discussion, assume that user device 105 may be running an indexing program, in which a virus request scan 1015 is received.

A processor of user device 105 may be running at 45 degrees Celsius and a cooling fan is required to run when the temperature is above 47 degrees Celsius. Even though a hard disk is spinning to support the viewing of video 1010, RES 300 utilizes the environmental factors in deciding whether virus scan request 1015 should be executed or delayed. For example, RES 300 may determine that the processor may rise above 47 degrees Celsius, if virus scan request 1015 was permitted to execute. RES 300 may also recognize that, this in turn, would cause the cooling fan to be turned on and result in an increase in power consumption. Accordingly, RES 300 decides to delay virus scan request 1020 to a later time so that the processor may operate below 47 degrees Celsius and user device 105 may operate at a lower power consumption level.

Figure 11:
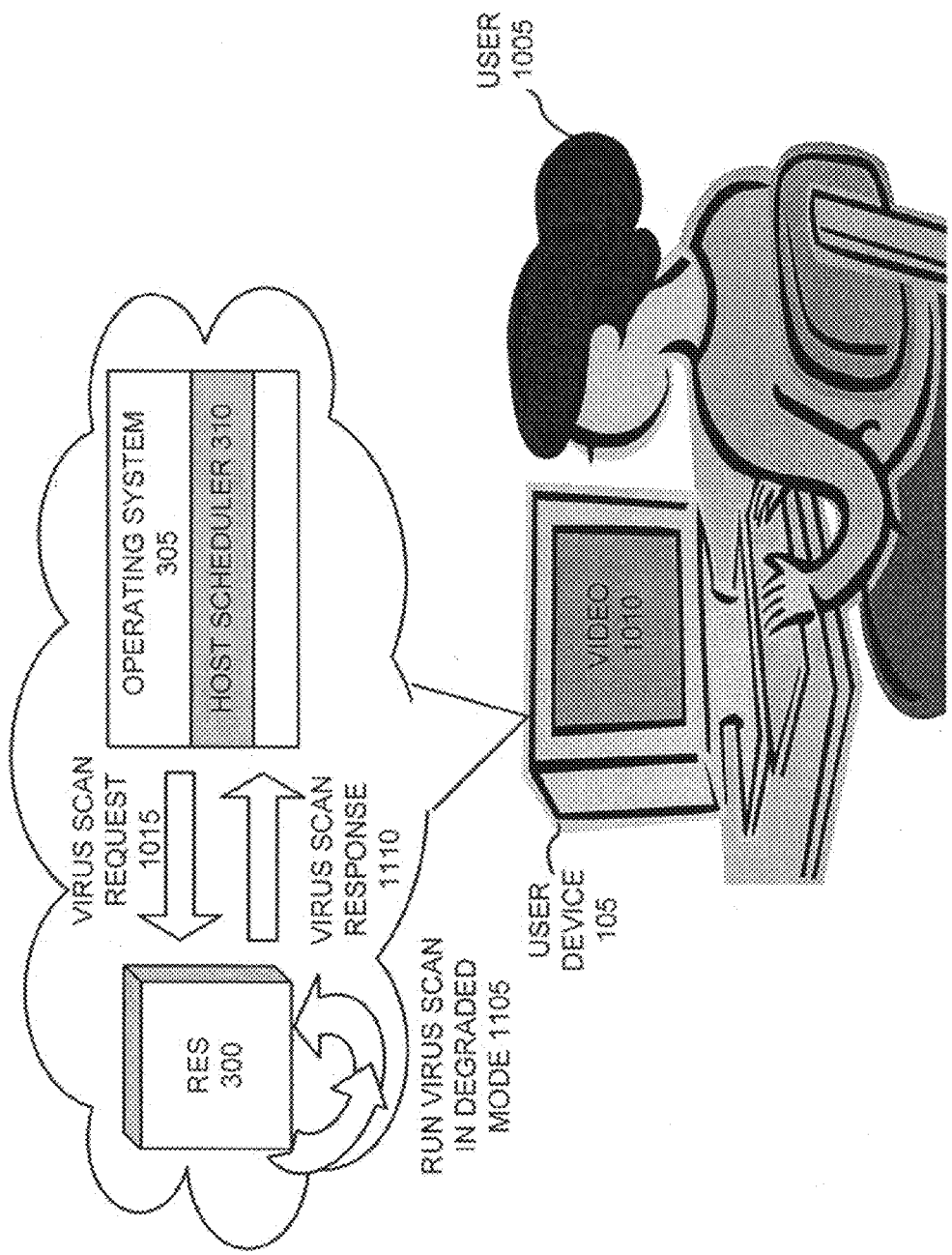
FIG. 11 is a diagram illustrating another example of the RES managing an exemplary process request.

FIG. 11 is a diagram illustrating another example of the RES managing an exemplary process request. Similar to the scenario presented in FIG. 10, user 1005 may be watching a video 1010 on user device 105. For purposes of discussion, assume that user device 105 may be running an indexing program, in which a virus request scan 1015 is received.

A processor of user device 105 may be running at 45 degrees Celsius and a cooling fan is required to run when the temperature is above 47 degrees Celsius. Even though a hard disk is spinning to support the viewing of video 1010, RES 300 utilizes the environmental factors in deciding whether virus scan request 1015 should be executed or delayed. For example, RES 300 may determine that the processor may not rise above 47 degrees Celsius, if virus scan request 1015 was permitted to execute in a degraded mode 1105 (using functions, such as NICE). Additionally, RES 300 may determine, since the hard disk is spinning, that to move a head actuator to perform a background virus scan may utilize minimal power. Accordingly, RES 300 may send a virus scan response 1110 to host scheduler 310 to indicate that virus scan request 1015 may be executed in a degraded mode.

Figure 12:
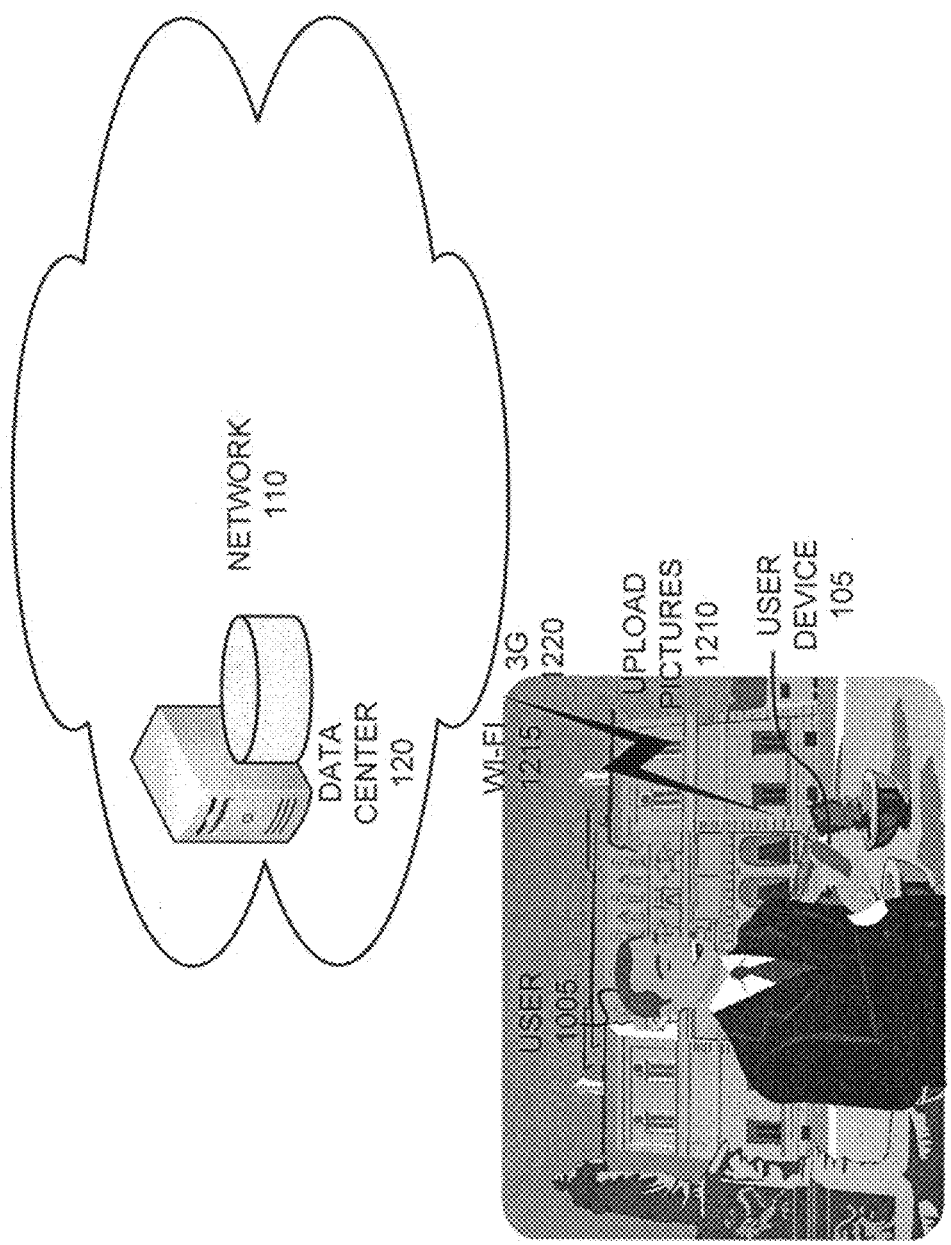
FIG. 12 is a diagram illustrating yet another example of the RES managing an exemplary process request.

FIG. 12 is a diagram illustrating yet another example of the RES managing an exemplary process request. As illustrated, user 1005 may be operating user device 105 to upload pictures 1210 to data center 120 in network 110. For example, data center 120 may provide a picture sharing service.

In one example case, assume that user device 105 is connected to data center 120 based on a WiFi connection 1215 where the available bandwidth of WiFi connection 1215 may be moderated based on the output power. In such a case, RES 300 may utilize the power/bandwidth trade-off information associated with various components of RES 300 (e.g., characteristic module 440) to determine a lowest cost (e.g., least power) to upload pictures 1210. In the event that the upload is opportunistic (e.g., the transfer takes place because WiFi connection 1215 is available) versus direct (e.g., based on a user command), then an optimal speed of transfer may be chosen by RES 300 by moderating the output power.

In another example case, assume that user device 105 may have a choice between Wi-Fi connection 1215 and a third generation (3G) connection 1220. For example, assume that 3G connection 1220 is available, however historical table 420 includes information that Wi-Fi connection 1215 may be available within the next 10 minutes. RES 300 may wait for Wi-Fi connection 1215 to become available because Wi-FI connection 1215 may expend less power. In another scenario, assume Wi-Fi connection 1215 is not available and will not become available. In this case, RES 300 may use the maximum available capacity associated with 3G connection 1220 to upload pictures 1210 without causing an increase in power above a certain power value.

CONCLUSION

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIG. 9, the order of the blocks may be modified in other implementations. Further, non-dependent blocks may be performed in parallel.

Also, certain aspects have been described as being implemented as "logic" or a "component" that performs one or more functions. This logic or component may include hardware, such as a processor, microprocessor, an ASIC, or a FPGA, or a combination of hardware and software, such as a processor/microprocessor executing instructions stored in a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

The invention claimed is:

1. A method comprising:
   determining, by a device, a current level of necessity associated with utilizing a resource;
   determining, by the device, a rate of change for the current level of necessity; and
   causing, by the device and based on the current level of necessity and the rate of change for the current level of necessity, an execution of a process, that utilizes the resource, at a first time or at a second time.

2. The method of claim 1, further comprising:
   determining, based on the current level of necessity and the rate of change for the current level of necessity, a projected level of necessity associated with utilizing the resource; and
   where causing the execution of the process at the first time or the second time includes:
      causing the execution of the process at the first time or the second time based on the current level of necessity and the projected level of necessity.

3. The method of claim 1, further comprising:
   determining a power consumption associated with the execution of the process;
   determining a first state of one or more power-consuming components,
      the first state being associated with the first time; and
   determining a second state of one or more power-consuming components,
      the second state being associated with the second time; and
   where causing the execution of the process at the first time or the second time includes:
      causing the execution of the process at the first time or the second time further based on the determined power consumption, the first state of the one or more power-consuming components, and the second state of the one or more power-consuming components.

4. The method of claim 1, further comprising:
   identifying another process,
      the other process being scheduled to be executed at the first time; and
   calculating a projected power consumption associated with executing the other process; and
   where causing the execution of the process at the first time or the second time includes:
      causing the execution of the process at the first time or the second time further based on the projected power consumption.

5. The method of claim 1, further comprising:
   determining, for the first time, one or more first values associated with environmental factors of the device; and
   determining, for the second time, one or more second values associated with the environmental factors of the device; and
   where causing the execution of the process at the first time or the second time includes:

causing the execution of the process at the first time or the second time further based on the one or more first values and the one or more second values.

6. The method of claim 5, where the environmental factors of the device include one or more of:
   a temperature,
   a thermal mass corresponding to an amount of heat that can be absorbed for each degree of temperature rise,
   an air pressure,
   a humidity, or
   a density altitude.

7. The method of claim 1, further comprising:
   determining data associated with a previous use of the resource; and
   where causing the execution of the process at the first time or the second time includes:
      causing the execution of the process at the first time or the second time further based on the data associated with the previous use of the resource.

8. A device comprising:
   one or more processors to:
      determine a first value representing a level of necessity associated with utilizing a resource at a first time,
      project a rate of change for the level of necessity over a particular period of time,
         the particular period of time being defined by the first time and a second time, and
      cause, based on the first value and the rate of change for the level of necessity, a process, that utilizes the resource, to be executed at the first time or at the second time.

9. The device of claim 8, where the one or more processors are further to:
   determine a power consumption associated with executing the process,
   determine a first state of one or more power-consuming components,
      the first state being associated with the first time, and
   determine a second state of one or more power-consuming components,
      the second state being associated with the second time, and
   where, when causing the execution of the process at the first time or the second time, the one or more processors are to:
      cause the process to execute at the first time or the second time further based on the determined power consumption, the first state of the one or more power-consuming components, and the second state of the one or more power-consuming components.

10. The device of claim 8, where the one or more processors are further to:
    identify another process,
       the other process being scheduled to be executed at the first time, and
    calculate a projected power consumption associated with executing the other process, and
    where, when causing the execution of the process at the first time or the second time, the one or more processors are to:
       cause the process to execute at the first time or the second time further based on the projected power consumption.

11. The device of claim 8, where the one or more processors are further to:
    determine, for the first time, one or more first values associated with environmental factors of the device, and
    determine, for the second time, one or more second values associated with the environmental factors of the device, and
    where, when causing the execution of the process at the first time or the second time, the one or more processors are to:
       cause the execution of the process at the first time or the second time further based on the one or more first values and the one or more second values.

12. The device of claim 11, where the environmental factors of the device include one or more of:
    a temperature associated with the device,
    a thermal mass corresponding to an amount of heat that can be absorbed by the device for each degree of temperature rise,
    an air pressure associated with the device,
    a humidity associated with the device, or
    a density altitude associated with the device.

13. The device of claim 8, where the one or more processors are further to:
    determine, based on the first value and the rate of change for the level of necessity, a second value representing a level of necessity associated with utilizing the resource at the second time, and
    where, when causing the process to execute at the first time or the second time, the one or more processors are to:
       cause the process to execute at the first time or the second time based on the first value and the second value.

14. The device of claim 8, where the one or more processors are further to:
    determine data associated with a previous utilization of the resource, and
    where, when causing the process to execute at the first time or the second time, the one or more processors are to:
       cause the process to execute at the first time or the second time further based on the data associated with the previous utilization of the resource.

15. A non-transitory computer-readable medium storing instructions, the instructions comprising:
    one or more instructions that, when executed by one or more processors, cause the one or more processors to:
       determine a first value representing a level of necessity associated with utilizing a resource at a first time,
       project a rate of change for the level of necessity over a particular period of time,
          the particular period of time being defined by the first time and a second time, and
       cause, based on the first value and the rate of change for the level of necessity, a process, that utilizes the resource, to be executed at the first time or at the second time.

16. The non-transitory computer-readable medium of claim 15, where the instructions further comprise:
    one or more instructions to determine a power consumption associated with executing the process,
    one or more instructions to determine a first state of one or more power-consuming components,
       the first state being associated with the first time, and
    one or more instructions to determine a second state of one or more power-consuming components,
       the second state being associated with the second time, and
    where the one or more instructions to cause the execution of the process at the first time or the second time include:
       one or more instructions to cause the process to execute at the first time or the second time further based on the determined power consumption, the first state of the one or more power-consuming components, and the second state of the one or more power-consuming components.

17. The non-transitory computer-readable medium of claim 15, where the instructions further comprise:
    one or more instructions to identify another process,
        the other process being scheduled to be executed at the first time, and
    one or more instructions to calculate a projected power consumption associated with executing the other process, and
    where the one or more instructions to cause the execution of the process at the first time or the second time include:
        one or more instructions to cause the process to execute at the first time or the second time further based on the projected power consumption.

18. The non-transitory computer-readable medium of claim 15, where the instructions further comprise:
    one or more instructions to determine, for the first time, one or more first values associated with environmental factors of the device, and
    one or more instructions to determine, for the second time, one or more second values associated with the environmental factors of the device, and
    where the one or more instructions to cause the execution of the process at the first time or the second time include:
        one or more instructions to cause the execution of the process at the first time or the second time further based on the one or more first values and the one or more second values.

19. The non-transitory computer-readable medium of claim 15, where the instructions further comprise:
    one or more instructions to determine, based on the first value and the rate of change for the level of necessity, a second value representing a level of necessity associated with utilizing the resource at the second time, and
    where the one or more instructions to cause the process to execute at the first time or the second time include:
        one or more instructions to cause the process to execute at the first time or the second time based on the first value and the second value.

20. The non-transitory computer-readable medium of claim 15, where the instructions further comprise:
    one or more instructions to determine data associated with a previous utilization of the resource, and
    where the one or more instructions to cause the process to execute at the first time or the second time include:
        one or more instructions to cause the process to execute at the first time or the second time further based on the data associated with the previous utilization of the resource.

* * * * *